(12) United States Patent
Laitila et al.

(10) Patent No.: US 9,310,018 B2
(45) Date of Patent: Apr. 12, 2016

(54) MULTI-PURPOSE BAG RACK

(71) Applicants: Toni Peter Laitila, Peterorough (CA);
Mika Brian Laitila, Peterborough (CA);
Antero Samuel Laitila, Peterborough (CA)

(72) Inventors: Toni Peter Laitila, Peterorough (CA);
Mika Brian Laitila, Peterborough (CA);
Antero Samuel Laitila, Peterborough (CA)

(*) Notice: Subject to any disclaimer, the term of this patent is extended or adjusted under 35 U.S.C. 154(b) by 0 days.

(21) Appl. No.: 14/459,460

(22) Filed: Aug. 14, 2014

(65) Prior Publication Data

US 2015/0048039 A1    Feb. 19, 2015

Related U.S. Application Data

(60) Provisional application No. 61/865,794, filed on Aug. 14, 2013.

(51) Int. Cl.
*A47G 29/00* (2006.01)
*F16M 11/04* (2006.01)
*A47F 13/08* (2006.01)
*B65B 67/12* (2006.01)

(52) U.S. Cl.
CPC .............. *F16M 11/04* (2013.01); *A47F 13/085* (2013.01); *B65B 67/1227* (2013.01); *B65B 67/1233* (2013.01)

(58) Field of Classification Search
CPC   B65B 67/12; B65B 67/1227; B65B 67/1233; B65F 1/1415; A47F 9/042; A47F 2009/041; A47F 2009/042; A47F 13/085; F16M 11/04; F16M 11/041
USPC .................................. 211/85.15; 248/99–101
See application file for complete search history.

(56) References Cited

U.S. PATENT DOCUMENTS

| | | | | | |
|---|---|---|---|---|---|
| 605,838 | A | * | 6/1898 | Ayres | 248/101 |
| 800,087 | A | * | 9/1905 | Downing | 248/101 |
| 1,269,577 | A | * | 6/1918 | Bolander | 248/101 |
| 2,488,782 | A | * | 11/1949 | Schultheiss | 248/101 |
| 3,298,647 | A | * | 1/1967 | Shepard | 248/101 |
| 4,538,783 | A | * | 9/1985 | Stobbe | 248/99 |
| 8,458,866 | B2 | * | 6/2013 | Hancz | 24/555 |

* cited by examiner

*Primary Examiner* — Korie H Chan
(74) *Attorney, Agent, or Firm* — Gowling WLF (Canada) LLP

(57) ABSTRACT

The disclosed invention relates to a bag rack for the multi-purpose of holding and dispensing disposable plastic bags as well as holding open reusable bags in a variety of configurations and positions. The multi-purpose bag comprises first and second bag support arm assemblies each of which comprises a pair of resiliently arms of different lengths and degree of flexibility for frictionally engaging reusable bag handles.

6 Claims, 24 Drawing Sheets

US 9,310,018 B2

MULTI-PURPOSE BAG RACK

FIELD

The present invention relates to a multi-purpose bag rack. More particularly, the present invention relates to a multi-purpose bag rack having the multi-purpose of holding and dispensing disposable plastic bags as well as holding open reusable bags of different sizes, shapes and dimensions.

BACKGROUND

In the grocery industry there has been a growing trend towards encouraging use of reusable bags over disposable plastic bags. However as more and more customers make the switch to using reusable bags, many grocery stores and supermarkets may experience difficulties in maintaining previous levels of efficiency and services at the checkout counter, in particular when using both types of bags with current bag racks.

When compared to conventional disposable plastic bags, reusable bags are generally more difficult to keep in place and have opened when placing purchased items inside. Further, given the wide variations in sizes, shapes, dimensions and materials, cashiers often need to readjust their bagging techniques for different reusable bags, while at the same time still accommodating use of disposable bags. Currently although many retailers have implemented various measures to address the problem, customers are often finding increased wait time and decreased satisfaction at the checkout counter.

SUMMARY

There is a need in the relevant industry for a new multi-purpose bag rack which could be adapted for the multi-purpose use with both traditional disposable plastic bags and more environmentally friendly reusable bags. In particular, the ability for convenience of positioning, retaining, and removing of both reusable and disposable bags when using the bag rack is desired.

It is therefore an object to provide a multi-purpose bag rack which could be used efficiently and conveniently with both disposable plastic bags and a wide variety of reusable bags. Specifically, an object is to provide a multi-purpose bag rack which may be adapted to hold and dispense disposable plastic bags as well as to hold open a reusable bag for placing contents inside.

A second object is to provide a multi-purpose bag rack which can be mounted on a surface or a wall for more stable operation and easier access.

In a preferred embodiment, there is provided a multi-purpose bag rack comprising first and second bag support arm assemblies. Each of the first and second bag support arm assemblies may comprise a pair of resiliently opposing arms suitable for frictionally engaging reusable bag handles. In a preferred embodiment one of the opposing arms comprise a resiliently deformable pinching wire for enabling placement and opening of reusable bags in a wide variety of configurations. In different embodiments the opposing arms may be of the same length or of different lengths and may even be replaced by a plurality of handle hold-down clamps.

Preferably, the multi-purpose bag rack further comprises a support frame. The first and second arm assemblies are preferably attached to either side of the support frame and perpendicular to the front surface of the support frame. Most preferably the first and second bag support arm assemblies are positioned at the same vertical position on either side of the support frame in substantially parallel orientation to each other.

Preferably, the multi-purpose bag rack further comprises a hook attached at an upper center position of the support frame. The hook may preferably be used to insert into a breakable center loop found on many types of conventional disposable plastic bags so as to allow securing of a bundle of disposable plastic bags to the support frame. To secure and permit convenient dispensing of the disposable plastic bags, the first and second bag support arm assemblies are preferably sized to slidably receive plastic bag handles and in such positions and orientations to allow inserting the hook through the bags' breakable center loops.

Preferably, the multi-purpose bag rack further comprises a base or a wall mount. The base is most preferably attached to the lower portion of the support frame and comprises at least one screw hole for receiving attachment screws.

BRIEF DESCRIPTION OF THE DRAWINGS

Reference may now be had to the following detailed description, taken together with the accompanying drawings, in which.

DETAILED DESCRIPTION OF THE INVENTION

The most preferred embodiments of the present invention are henceforth described with reference to FIGS. 1 to 24. The most preferred embodiments are provided as mere examples which are in no way intended to limit the scope of the present invention. It will be readily apparent to a person skilled in the art that variations and modifications may be made to the most preferred embodiments within the scope of the present invention.

Figure 1:
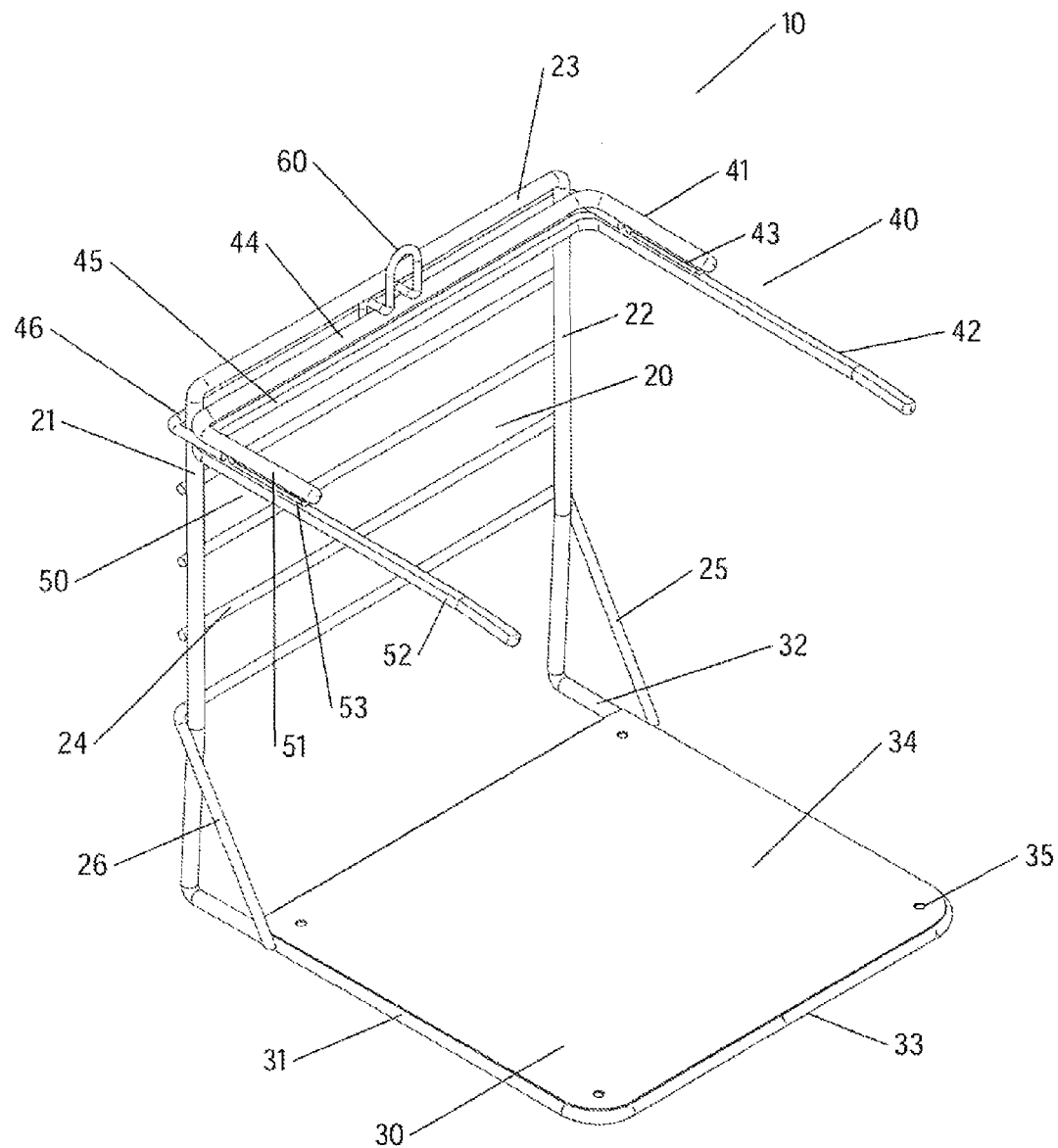
FIG. 1 is a perspective view of a multi-purpose bag rack.

FIG. 1 is a perspective view of a bag rack 10 which is adapted for the multi-purpose of holding and dispensing disposable plastic bags as well as holding a reusable bag in different configurations in accordance with a preferred embodiment of the present invention. The multi-purpose bag rack 10 can comprise a support frame 20, a base 30, and first and second bag support arm assemblies 40 and 50.

Figure 2:
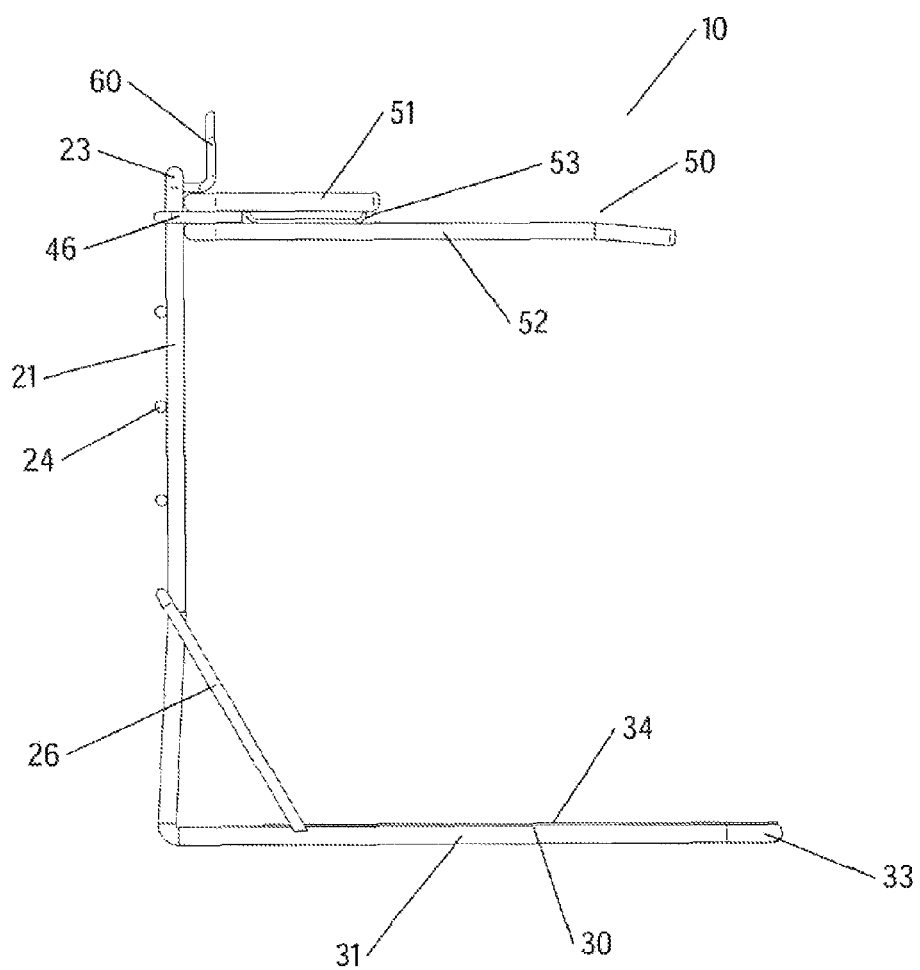
FIG. 2 is a side view of the multi-purpose bag rack of FIG. 1.

In reference to FIGS. 1 and 2, the support frame 20 is rectangular in structure and comprises a pair of lateral support beams 21 and 22 and a top beam 23. The support frame further comprises a plurality of ribs 24 traversing widthwise for added structural rigidity. A pair of cross beams 25 and 26 which attach on one end to the lowermost one of the plurality of ribs 24 and on the other to the lateral sides of the base can be provided to support the orientation (e.g. substantially vertical) of the support frame 20.

Figure 3:
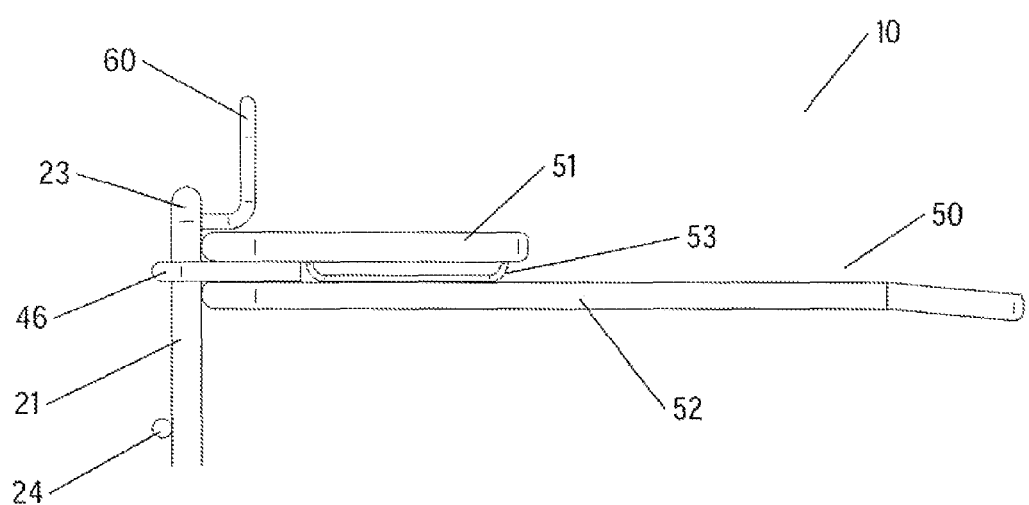
FIG. 3 is a side view of the upper portion of the multi-purpose bag rack of FIG. 1.

In reference to FIGS. 2 and 3, a hook 60 attaches to the front side of the top beam 23. The hook 60 bends vertically upward to provide securing of a plurality of disposable plastic bags through their breakable center loops.

In reference to FIGS. 1 and 2, the base 30 comprises a pair of lateral base beams 31 and 32, an anterior base beam 33 and a base platform 34. The base platform 34 fixedly rests on the base beams 31 and 32 and the anterior base beam 33. A plurality of screw holes 35 is provided on the surface of the base platform 34 to provide fixing the multi-purpose bag rack 10 using screws or nails.

In reference, to FIGS. 1 and 3, the first and second bag support arm assemblies 40 and 50 extend horizontally and perpendicular to the front surface of the support frame 20. Each of the first and second bag support arm assemblies 40 and 50 comprises a pair of resiliently opposing upper and lower arms. In particular, the first bag support arm assembly 40 comprises a first upper opposing arm 41 above a first lower opposing arm 42. Both the first upper and lower opposing arms 41 and 42 are attached on the proximal end close to the support frame 20 and can be biased in movement towards each other. Likewise, the second bag support arm assembly 50 comprises a second upper opposing arm 51 and a second lower opposing arm 52. Both the second upper and lower opposing arms 51 and 52 are also attached on the proximal end close to the support frame 20 and can be biased in movement towards each other. As such, the upper arm 41,51 has a greater degree of flexibility than the lower arm 42,52, thus providing for advantageously of facilitating insertion, retention, and subsequent removal of handles 71 of reusable bag 70 (see FIG. 4) between the arms 41,42 51,52 of the arm assemblies 40,50, while at the same time providing for rigidity and support of the both bag types (e.g. disposable and reusable) and their contents when hung from the arm assemblies 40,50.

The first and second lower opposing arms 42 and 52 can have flat upper surface and bevelled at the distal end sloping downwards away from the support frame 20. The first and second upper opposing arms 41 and 42 can have upwardly bent distal tips, as desired.

In reference, to FIGS. 1 and 3, the proximal ends of the first and second upper opposing arms 41 and 51 can be connected to the opposing ends of an upper connecting tube 44 which attaches to the front face of the support frame 20. Similarly the first and second lower opposing arms 42 and 52 can have proximal ends connected to the opposing ends of a lower connecting tube 45 which cross-wise (e.g. horizontally) attaches to the front face of the support frame 20. A posterior support tube 46 which attaches to the rear side of the support frame 20 have two arms which cross-wise (e.g. horizontally) attaches to the upper opposing arms 41 and 51 on the upper surface and attaches to the lower opposing arms 42 and 52 on the lower surface.

In reference to FIGS. 1 and 2, the first and second upper opposing arms 41 and 51 include first and second arm portions 43 and 53, respectively, to allow deformably and frictionally engaging bag handles in a wide variety of configurations and positions. The first and second arm portions 43 and 53 can have opposing ends which curve upwards to attach to the bottom surface of the first and second upper opposing arms 41 and 51, respectively. To allow frictional engagement of bag handles, the arm portions 43 and 53 are closely spaced or in physical contact with the lower arms 42 and 52. As such, the upper arm portions 43 and 53 has a greater degree of flexibility than the lower arm 42,52, thus providing for advantageously of facilitating insertion, retention, and subsequent removal of handles 71 of reusable bag 70 (see FIG. 4) between the arm portions 43 and 53 and arms 42,52 of the arm assemblies 40,50, while at the same time providing for rigidity and support of the both bag types (e.g. disposable and reusable) and their contents when hung from the arm assemblies 40,50. As such, the bag rack 10 can have each of the arm assemblies 40,50 include the arms as the upper arm 43, 53 and the lower arm 42,52 and an additional arm 41,51 positioned above the upper arm 43,53. The additional arm 41,51 can be of the same degree of flexibility as the lower arm 42,52, such that the upper arm 43,53 is positioned between the additional arm 41,51 and the lower arm 42,52.

In any event, it is recognised that the arm assemblies 40,50 include a pair of arms spaced apart (e.g. opposed) from one another, in order to provide for insertion, retention, and subsequent removal of handles 71 of reusable bag 70 (see FIG. 4) between the arm pair. One embodiment of the opposed arm pair configuration is the arm 41 and arm 42 of one arm assembly 40 for one of the handles 71 and the arm 51 and arm 52 of one arm assembly 50 for one of the handles 71, such that only two opposed arms are present and the upper arm 41,51 is greater in degree of flexibility than the degree of flexibility of the respective lower arm 42,52 of the two arms of the arm assembly 40,50. In a further embodiment, the opposed arm pair configuration is the arm portion 43 and arm 42 of one arm assembly 40 for one of the handles 71 and the arm 513 and arm 52 of one arm assembly 50 for one of the handles 71, such that the opposed arms are present including arms 41,51 and the upper arm 43,53 is greater in degree of flexibility than the degree of flexibility of the respective lower arm 42,52 of the multiple arms of the arm assembly 40,50.

The difference in degree of flexibility between the arms 41,51 and 42,52 or between arms 43,53 and 42,52 can be provided by using different materials having different moduli of elasticity. Alternatively or in addition to different modulus of elasticity, it is recognised that difference in degree of flexibility between the arms 41,51 and 42,52 or between arms 43,53 and 42,52 can be provided by differing material thickness (e.g. diameter), such that arms 41,51 or 43,53 have one or more sections along the arm length of lower cross sectional area than the cross sectional area of arms 42,52. For example, the cross sectional area of the arms 41,51 43,53 can be uniform over their length or can have region(s) of smaller cross section than other regions of the arms 41,51 43,53 to provide for a greater degree of flexibility of the arms 41,51, 43, 53 relative to the lesser degree of flexibility of the lower arms 42,52.

Figure 4:
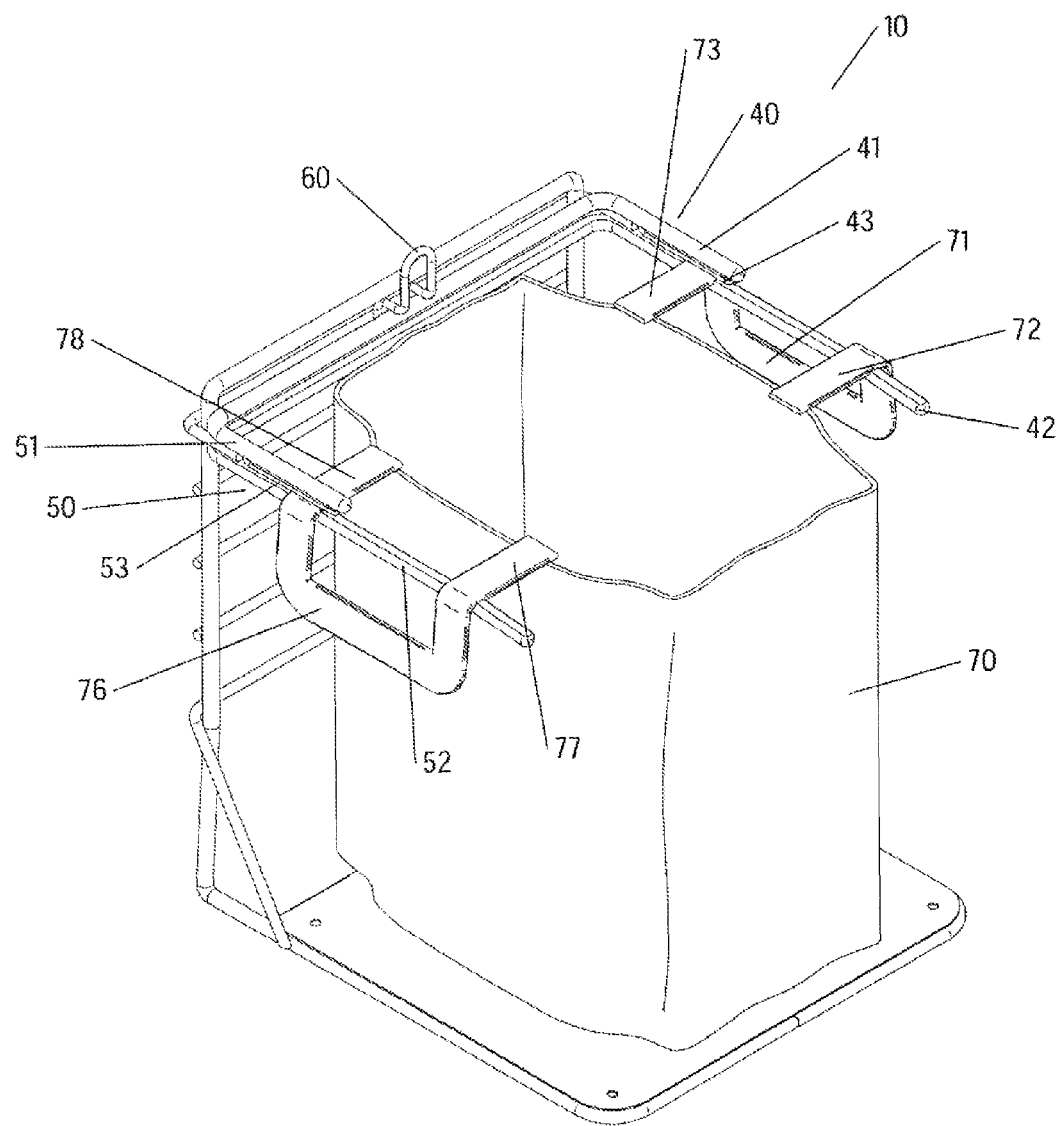
FIG. 4 is a perspective view of the multi-purpose bag rack of FIG. 1 in operation with a reusable bag.

FIG. 4 provides a perspective view of the multi-purpose bag rack 10 in operation with a reusable bag 70 in one open configuration. The reusable bag 70 comprises first and second handles 71 and 76 on opposite sides. The first handle 71 comprises two first strap ends 72 and 73 which connects to the rim of the reusable bag 70 on one side. Likewise, the second handle 76 comprises two second strap ends 77 and 78 which connects to the rim of the reusable bag 70 on the other side. To place the reusable bag 70 into the configuration shown in FIG. 4, the handles 71 and 76 are inserted through the first and second bag support arm assemblies 40 and 50, respectively. In particular, to frictionally engage the first handle 71 the first strap ends 72 and 73 are inserted between the first lower opposing arm 42 and the first arm portion 43. Similarly to frictionally engage the second handle 76 the second strap ends 72 and 73 are inserted between the second lower opposing arm 52 and the second arm portion 53. To provide more open access to the interior of the reusable bag 70 as shown in FIG. 4 the first strap ends 72 and 73 are adjusted apart from each other and similarly the second strap ends 76 and 77 are adjusted apart from each other. Although only a single reusable bag is shown in FIG. 4, a plurality of reusable bags may be engaged and held in the multi-purpose rack 10.

Although not explicitly shown in FIG. 4, the bag rack 10 may be adapted for the multipurpose of also mounting a plurality of disposable plastic bags between the support frame 20 and the reusable bag 70. To load the disposable plastic bags the first and second bag support arm assemblies 40 and 50 slidably receive the handles of the disposable plastic bags. Once placed close to the front side of the support frame 20 the disposable plastic bags are secured to the multi-purpose bag rack 10 by inserting the hook 60 through the breakable center loop found on many types of conventional disposable plastic bags. As such, the handles of the disposable bags, not shown, would go around and encircle both the upper arm 41,51, 43,53 and lower arms 42,52 simultaneously, once mounted on the arm assemblies 40,50, as compared to the reusable bag arms 71,76 which are inserted and retained between the opposed arm configuration of upper arms 41, 51 and lower arms 42, 52 or between upper arms 43, 53 and lower arms 42, 52, as desired. It is the advantage of difference in flexibility as discussed above that provides for ease of insertion, retention and removal of arms 71,76 for the reusable bags 70 while at the same time providing for hanging and support of bags and bag contents from the arm assemblies 40,50 (via relatively rigid lower arms 42,52) for both reusable and disposable bags.

The preferred bag rack 10 shown in FIGS. 1 to 6, has feature of the first and second upper opposing arms 141 and 151 and/or the first and second arm portions 143 and 153 being shorter than first and second lower opposing arms 142 and 152. It is envisioned that only a single strap end of each bag handle could be slidably inserted between the lower opposing arms 142 and 152 and the arm portions 143 and 153 while the other strap end loosely rests on the proximal end of the lower opposing arms 142 and 152. The lower opposing arms 142 and 152 could have distal ends which curves upward to prevent the loose strap ends from falling off. For more secure engagement the lower opposing arms 142 and 152 can also comprise split clamping ends to securely fasten the loose strap ends. As such, it is advantageous that the upper arms 41,51 and/or 43,53 are shorter that the lower arms 42,52, as the length of travel of the straps 71,76 between the upper arms 41,51,43,53 and lower arms 42,52 is minimized while at the same time providing for proper use and support of the disposable bags by the arm assemblies 40,50. It is recognised that ease and efficiency of usage of strap 71,76 retention by the arm assemblies 40,50 decreases as the upper arms 41,51, 43,53 become too close to the length of the lower arms 42,52. For example, the length of the upper arms 41,51,43,53 can be less that ⅘ of the lower arms 42,52. For example, the length of the upper arms 41,51,43,53 can be less that ¾ of the lower arms 42,52. For example, the length of the upper arms 41,51, 43,53 can be less that ½ of the lower arms 42,52. For example, the length of the upper arms 41,51,43,53 can be less that ⅝ of the lower arms 42,52. Also, it is recognised that preferably, the arm assemblies 40,50 can each have a minimum of components to facilitate ease of use of the bag rack 10, for example each having only one upper arm 41,51 and one lower arm 42,52.

Figure 10:
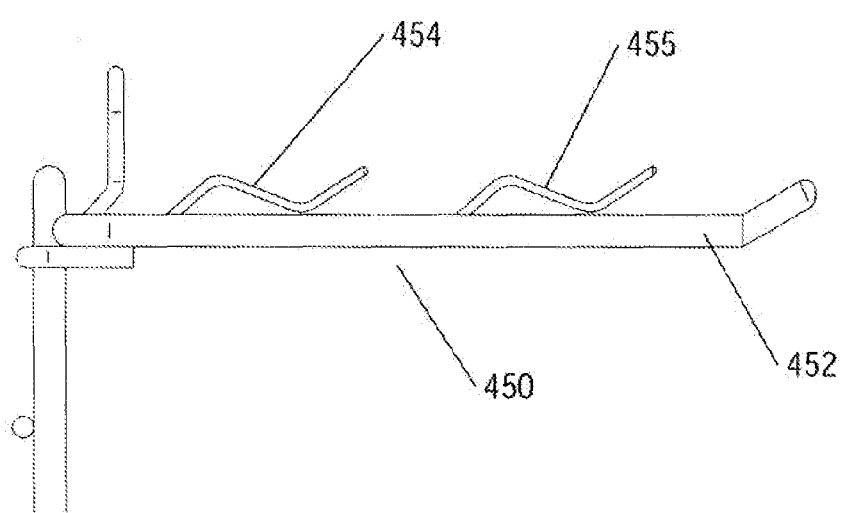
FIG. 10 is a side view of an alternative embodiment of the bag support arm assembly of FIG. 1.

FIG. 10 provides a variation of a bag support arm assembly 450 comprising a lower opposable arm 452 and a pair of handle hold-down clamps 454 and 455. It is envisioned that strap ends of bag handles could be conveniently inserted and held down by the handle hold-down clamps 454 and 455 to permit open holding of reusable bags in a very consistent manner. It is further envisioned that the handle hold-down clamps 454 and 455 are movably configurable along the axial length of the lower opposable arm 452 so as to permit consistent bag holding in a desired configuration. The handle hold-down clamps 454 and 455 may also be removed or more hold-down clamps may be added to hold more than one reusable bag at a time.

Figure 5:
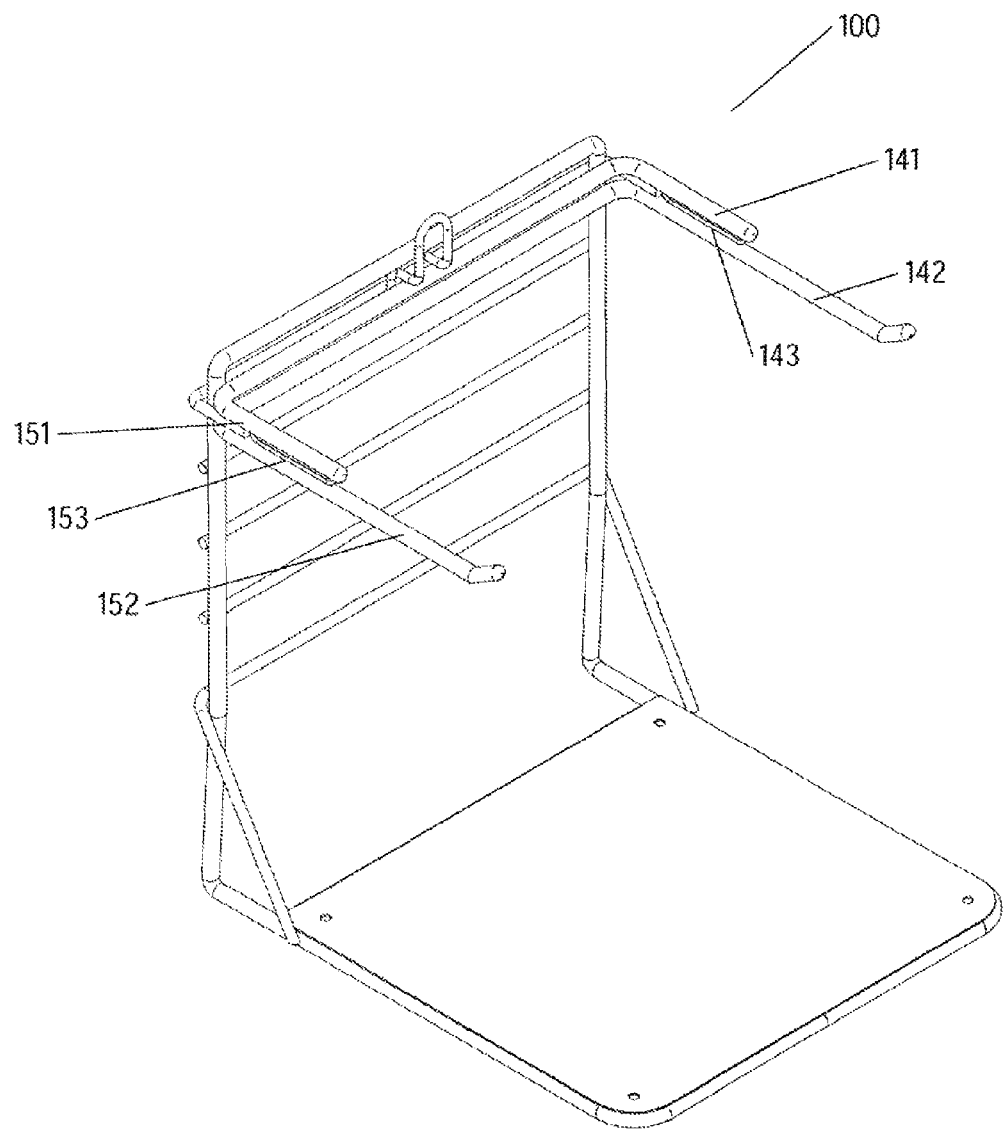
FIG. 5 is a perspective view of an alternative embodiment of the multi-purpose bag rack of FIG. 1.
Figure 6:
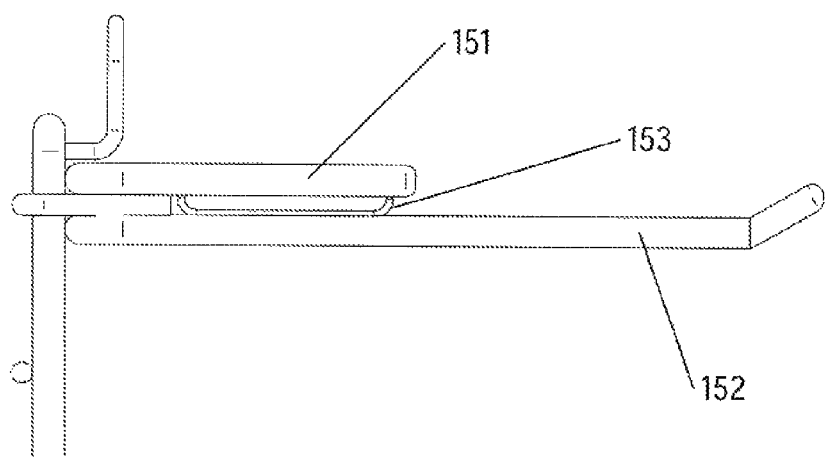
FIG. 6 is a side view of the upper portion of the multi-purpose bag rack of FIG. 5.
Figure 7:
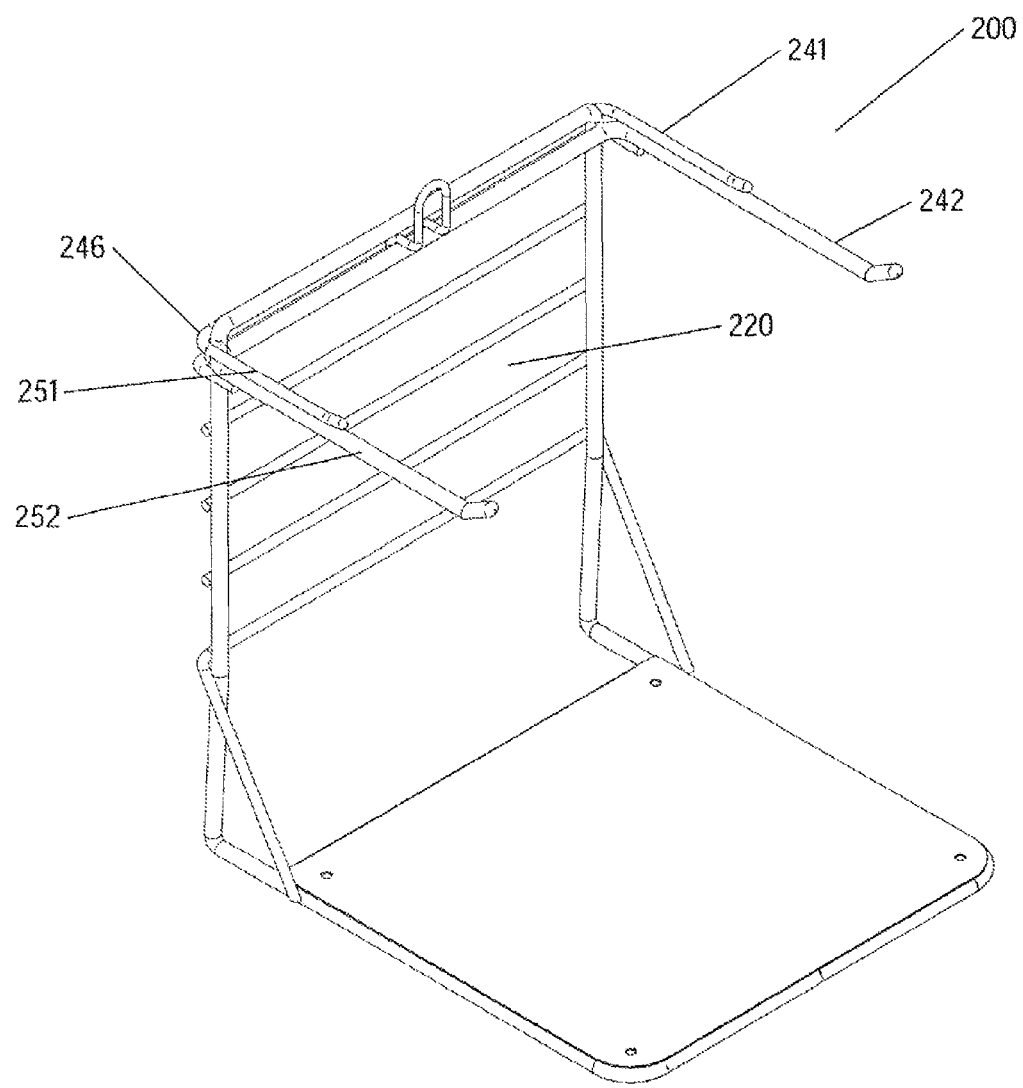
FIG. 7 is a perspective view of an alternative embodiment of the multi-purpose bag rack of FIG. 1.
Figure 8:
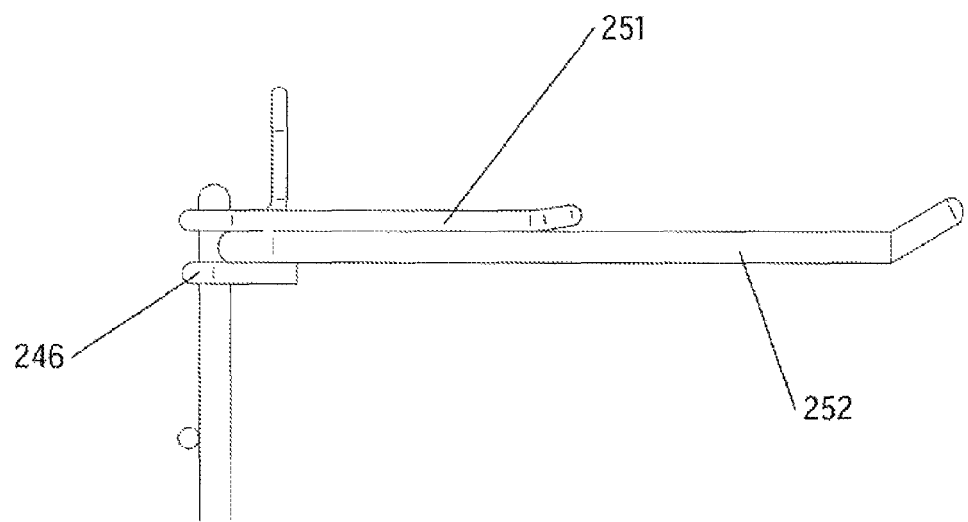
FIG. 8 is a side view of the upper portion of the multi-purpose bag rack of FIG. 7.

FIGS. 7 and 8 provides another variation product 200 similar to the variation product 100 shown in FIGS. 5 to 6, however no arm portions 43,53 are provided. Further, first and second upper opposing arms 241 and 251 are adjacent or physically in contact with lower first and second opposing arms 242 and 252, respectively. A posterior tube 246 which attaches horizontally on the rear surface of a support frame 220 have arms which extend below the lower opposing arms 242 and 252. For more convenient insertion of strap ends of bag handles the first and second upper opposing arms 241 and 251 have upwardly curved distal tips.

Figure 9:
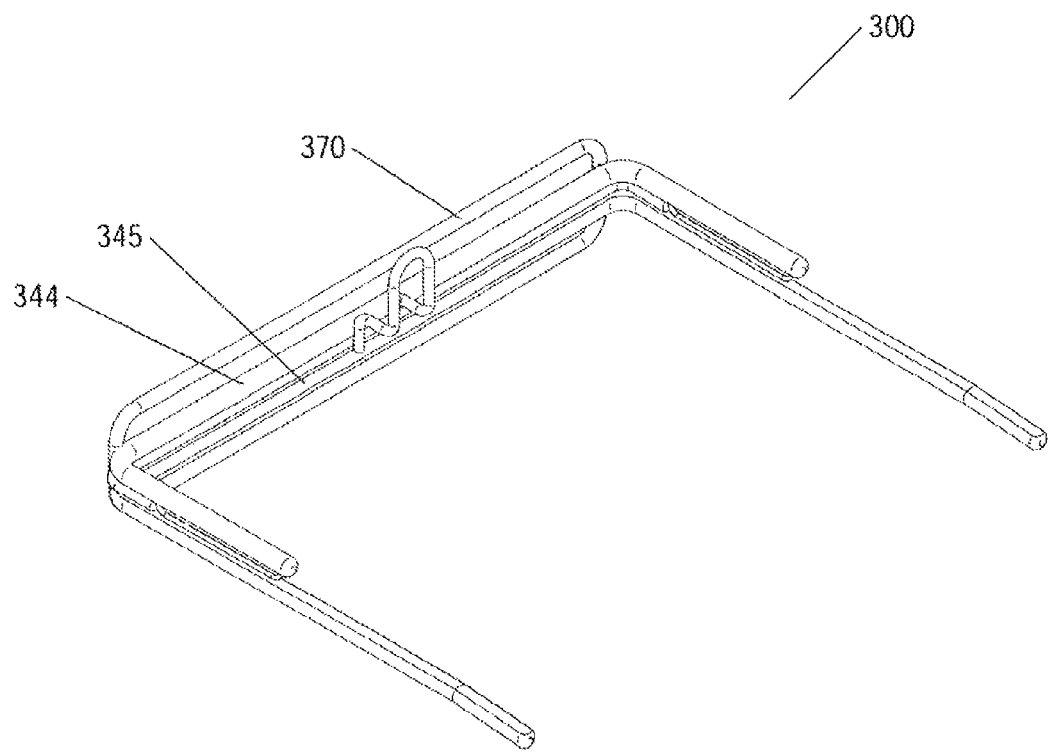
FIG. 9 is a perspective view of an alternative embodiment of the multi-purpose bag rack of FIG. 1.

FIG. 9 provides another preferred variation product 300 similar to the preferred multipurpose bag rack 10 shown in FIGS. 1 to 4, however instead of a support frame and a base, a wall mount 370 is provided. The wall mount 370 is rectangular in structure and attaches to the rear side of upper and lower connecting tubes 344 and 345. Although not explicitly shown in FIG. 9, it is envisioned that the wall mount 370 can comprise attachment means to attach the variation product 300 to a wall.

Referring to FIGS. 11-15, shown is an alternative embodiment of the bag rack 10 holding a single reusable bag 70 via handles 71,76.

Figure 11:
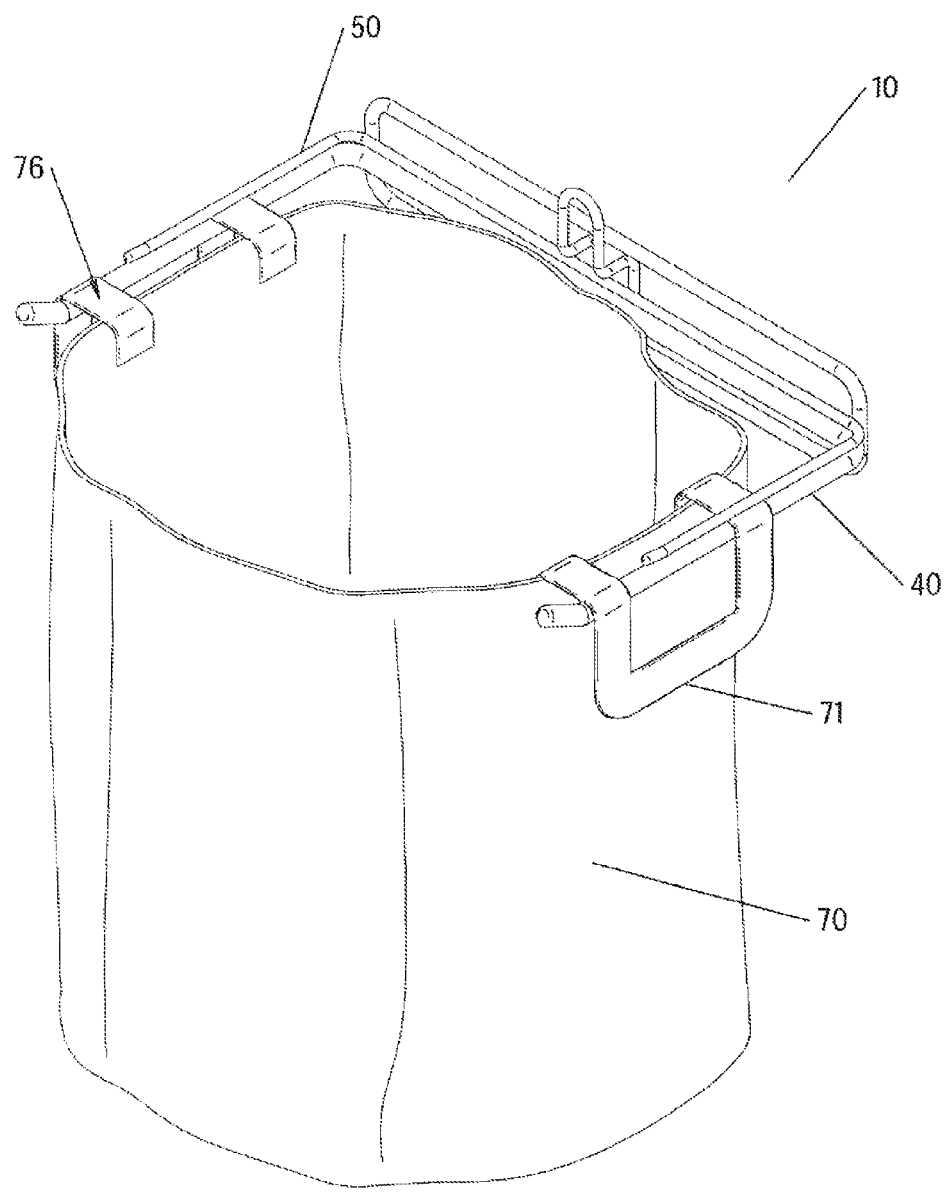
FIG. 11-15 shown an alternative embodiment of the bag rack of FIG. 1.
Figure 12:
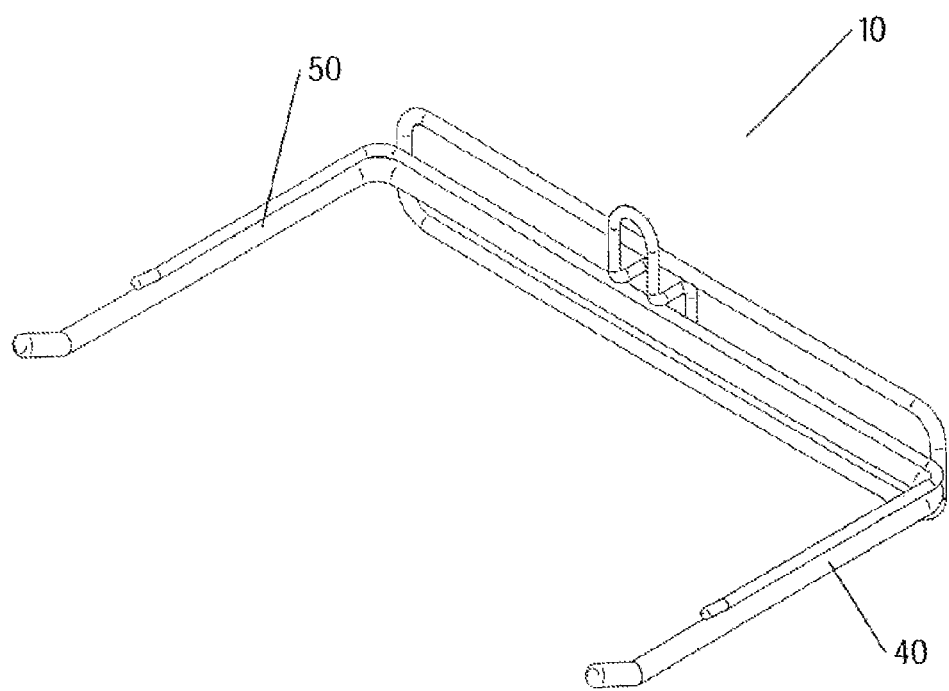
Figure 13:
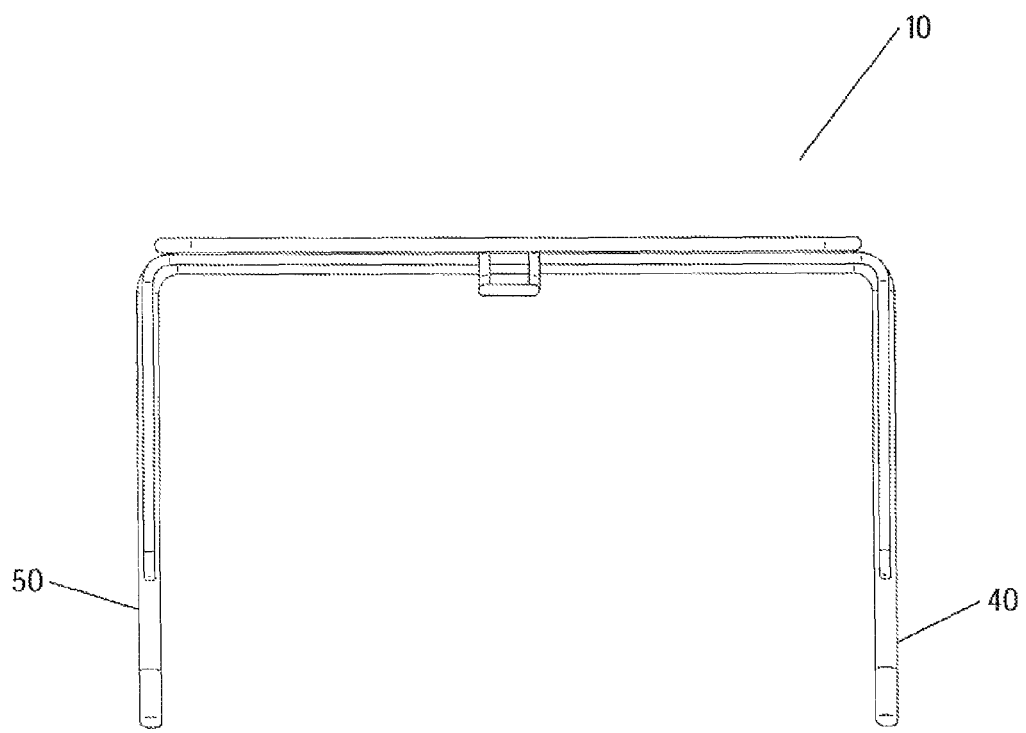
Figure 14:
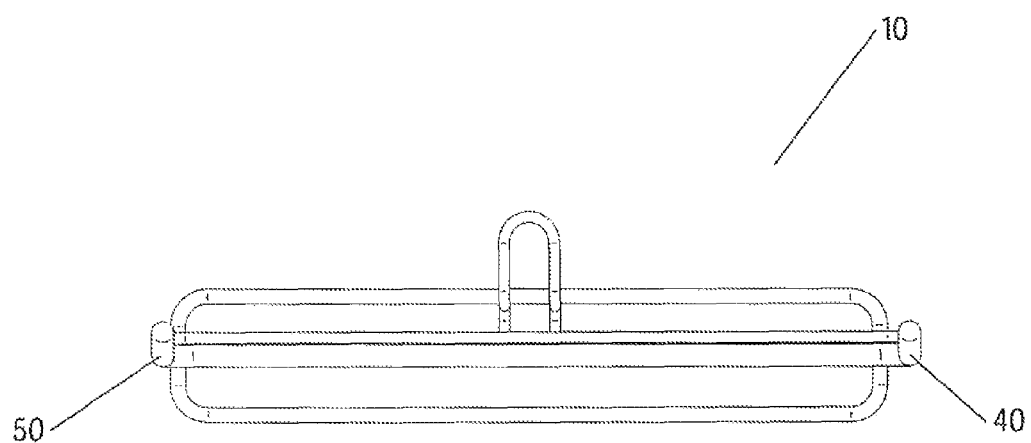
Figure 15:
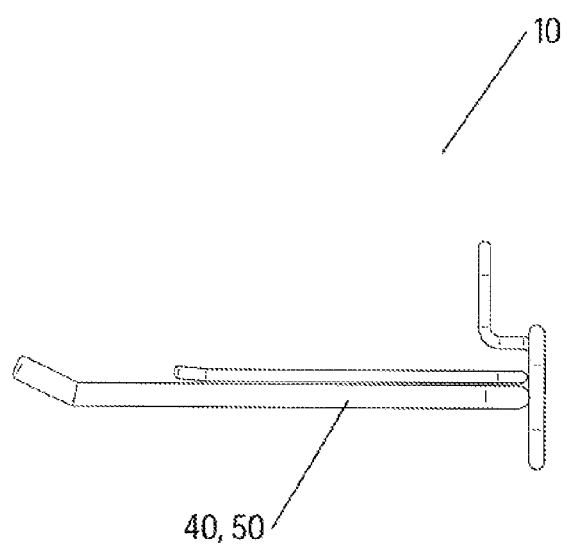
Figure 16:
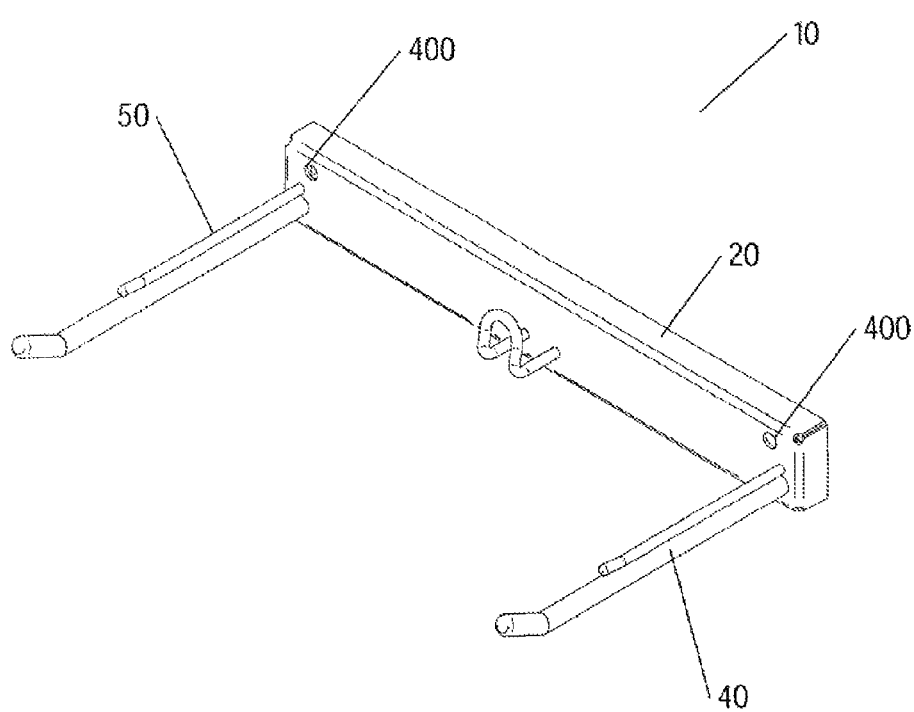
FIG. 16-23 shown an alternative embodiment of the bag rack of FIG. 1.
Figure 17:
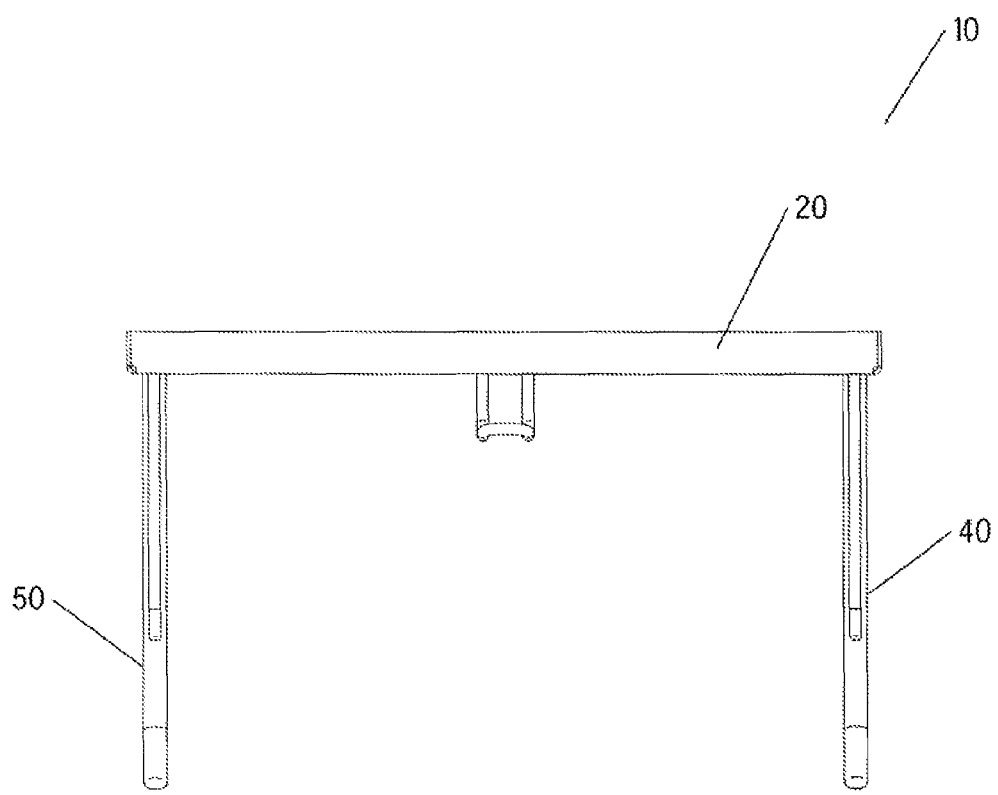
Figure 18:
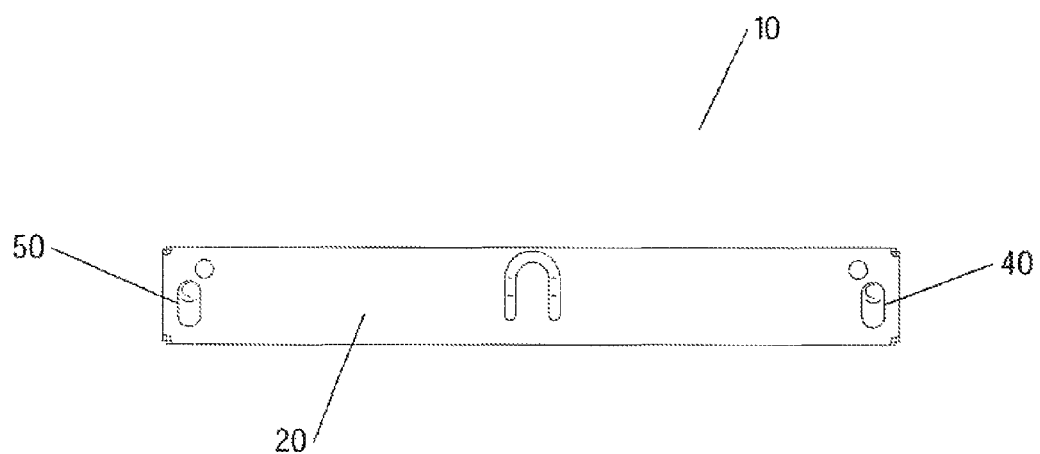
Figure 19:
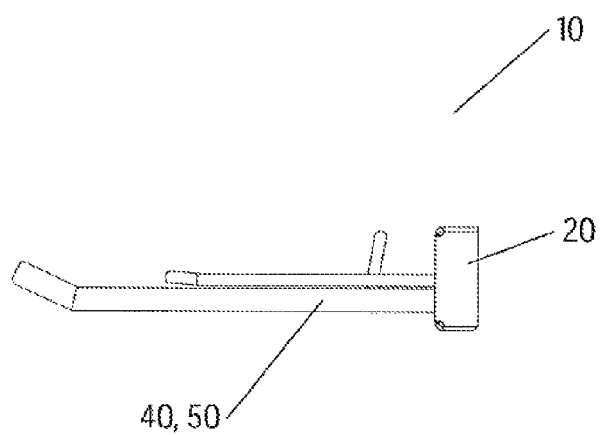
Figure 20:
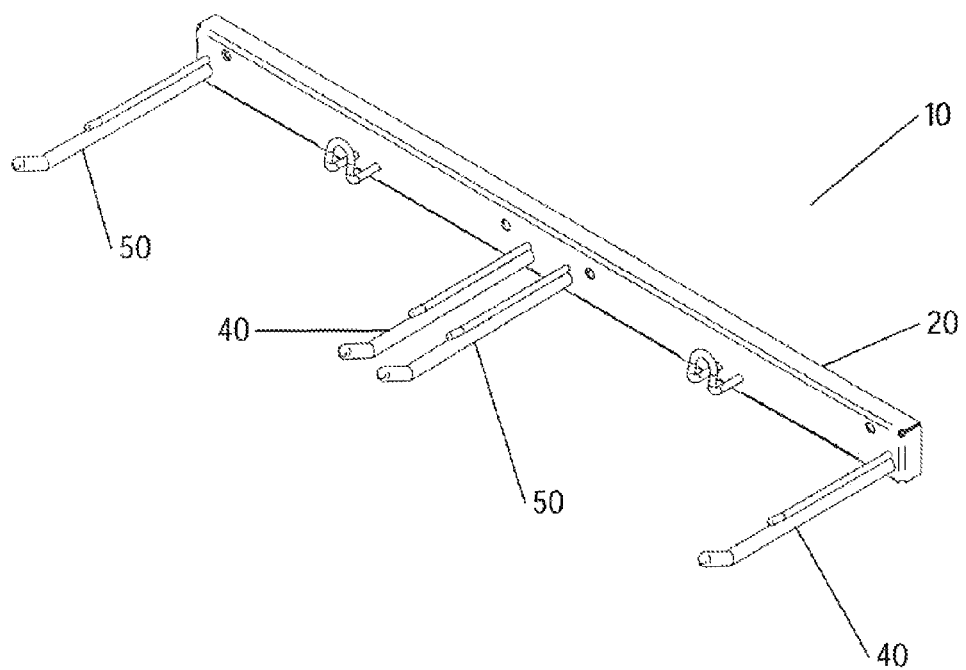
Figure 21:
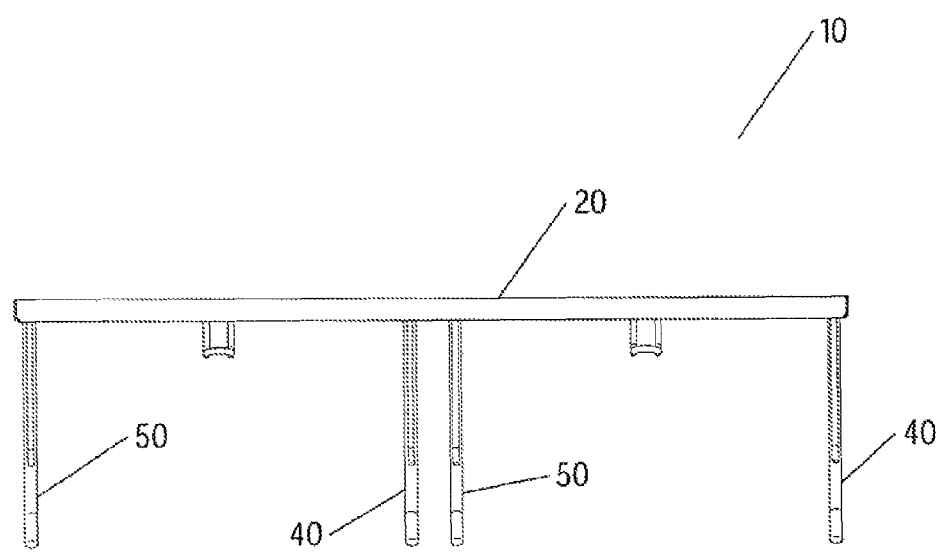
Figure 22:
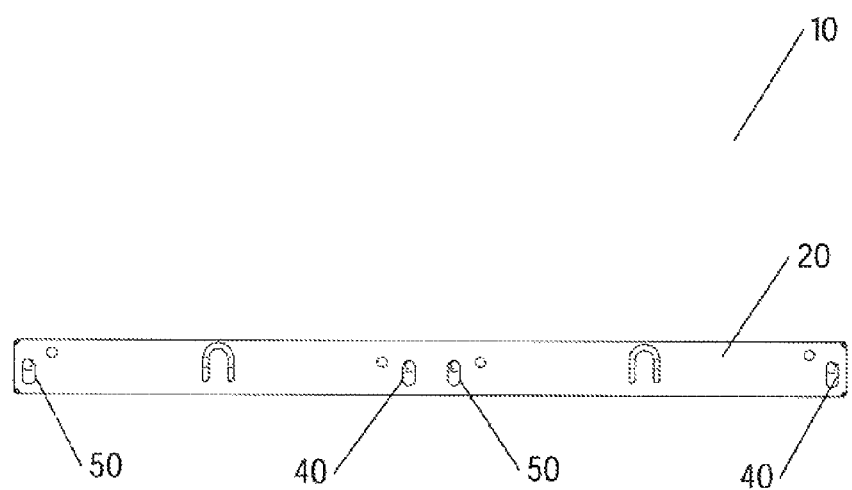
Figure 23:
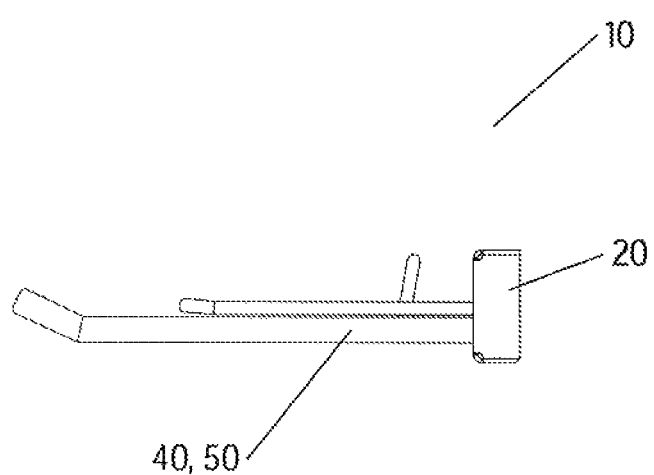

Referring to FIGS. 16-23, shown is an alternative embodiment of the bag rack 10 holding either a single reusable bag 70 via handles 71,76 or double reusable bag 70 (see FIG. 11). In this embodiment, the support frame 20 includes a box to which the arms 41,51,42,52 are connected (e.g. welded or otherwise mechanically affixed). In turn, the support fame 20 provides mounting regions 400 (e.g. holes) for using fasteners such as screws to attach the support frame 20 to a support wall adjacent to a bagging station of a store.

Figure 24:
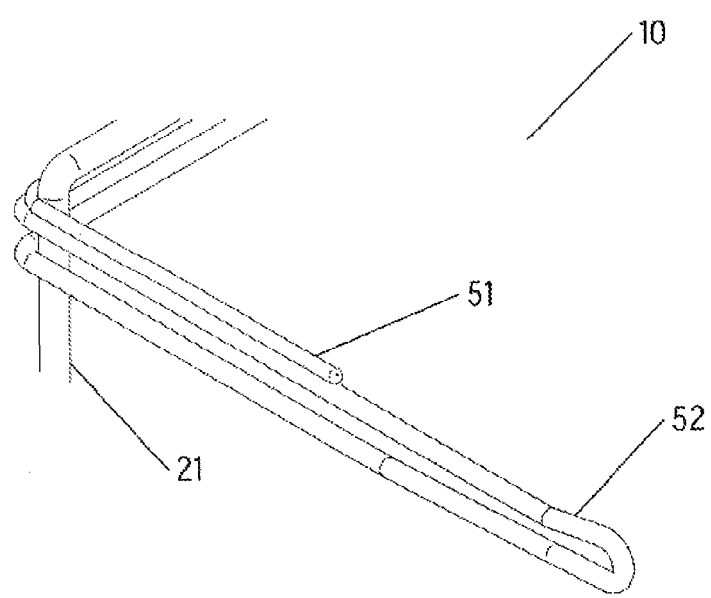
FIG. 24 shows an alternative embodiment of the lower arm of FIG. 1.

FIG. 24 is an alternative embodiment of the lower arm 42,52 to provide for the degree of resiliency of the lower arm 42,52 to be greater than the degree of resiliency of the upper arm 41,51. In other words, the lower arm 42,52 has the degree of flexibility to be less than the degree of flexibility of the upper arm 41,51.

We claim:
1. A bag rack comprising:
a support frame;
a first bag support arm assembly having a first pair of opposed arms attached to the support frame on one end of the support frame, the first pair of opposed arms having a first upper arm and a first lower arm, the first upper arm being of a length less than the first lower arm and having a degree of flexibility greater than a degree of flexibility of the first lower arm, wherein the first upper arm is flexible from a first position in which a portion of the first upper arm distal the support frame contacts the first lower arm to a second position in which the portion of the first upper arm is spaced from the first lower arm; and a second bag support arm assembly having a second pair of opposed arms attached to the support frame on another end of the support frame opposite the one end, the second pair of opposed arms having a second upper arm and a second lower arm, the second upper arm being of a length less than the second lower arm and having a degree of flexibility greater than a degree of flexibility of the second lower arm, wherein the second upper arm is flexible from a first position in which a portion of the second upper arm distal the support frame contacts the second lower arm to a second position in which the portion of the second upper arm is spaced from the second lower arm.

2. The bag rack of claim 1, wherein difference in the degree of flexibility between the upper and lower arms is provided by a difference in modulus of elasticity in the respective arm material.

3. The bag rack of claim 1, wherein difference in the degree of flexibility between the upper and lower arms is provided by a difference in cross sectional area in the respective arm material.

4. The bag rack of claim 3, wherein each of the arm assemblies include only two arms as the upper arm and the lower arm.

5. The bag rack of claim 3, wherein each of the arm assemblies include the arms as the upper arm and the lower arm and an additional arm positioned above the upper arm.

6. The hag rack of claim 5, wherein the additional arm is of the same degree of flexibility as the lower arm, such that the upper arm is positioned between the additional arm and the lower arm.

* * * * *